United States Patent [19]
Baker et al.

[11] Patent Number: 4,897,986
[45] Date of Patent: Feb. 6, 1990

[54] CANE HARVESTER FEED ROLL MOUNTING APPARATUS

[75] Inventors: Malcolm J. Baker; John G. Williams; Graham G. Yates, all of Bundaberg, Australia

[73] Assignee: Austoft Industries, Ltd., Australia

[21] Appl. No.: 175,686

[22] Filed: Mar. 23, 1988

Related U.S. Application Data

[63] Continuation of Ser. No. 765,214, Aug. 13, 1985, abandoned.

[30] Foreign Application Priority Data

Aug. 13, 1984 [AU] Australia .................... PG6527
Aug. 13, 1984 [AU] Australia .................... PG6526
Aug. 13, 1984 [AU] Australia .................... PG6528

[51] Int. Cl.⁴ .................................. A01D 45/10
[52] U.S. Cl. .................................. 56/13.9; 56/14.2; 56/60; 56/DIG. 1; 29/119; 72/239; 384/537
[58] Field of Search .......... 384/903, 510, 525, 537, 384/903, 539, 542, 559, 562; 56/14.1, 14.2, 13.9, DIG. 1, 104, 60; 241/285 R; 100/168, 176; 29/118, 119, 129; 72/238, 239, 237, 249

[56] References Cited

U.S. PATENT DOCUMENTS 3,618,646 11/1971 Lewis .................... 100/176
4,364,615 12/1982 Euler .................... 384/903
4,386,492 6/1983 Tilby .................... 56/13.9

*Primary Examiner*—John Weiss
*Attorney, Agent, or Firm*—Oliff & Berridge

[57] ABSTRACT

A mounting connection for a feed roller removably connected between oppositely located frame sections of a cane harvester. A splined adaptor plate is connected to an end of the feed roller about its longitudinal axis and within the transverse width between the frame sections. A motor having a shaft with a pinion mounted thereon is operable to engage with the splined adaptor plate. The motor is removably connected to the outside of one of the frame sections and the pinion is of a diameter sufficient to be withdrawn through the frame with the motor. After removing a similar connection on the opposite side of the feed roller, the feed roller is free of any connection to the frame and may be lowered within the frame sections and removed.

5 Claims, 10 Drawing Sheets

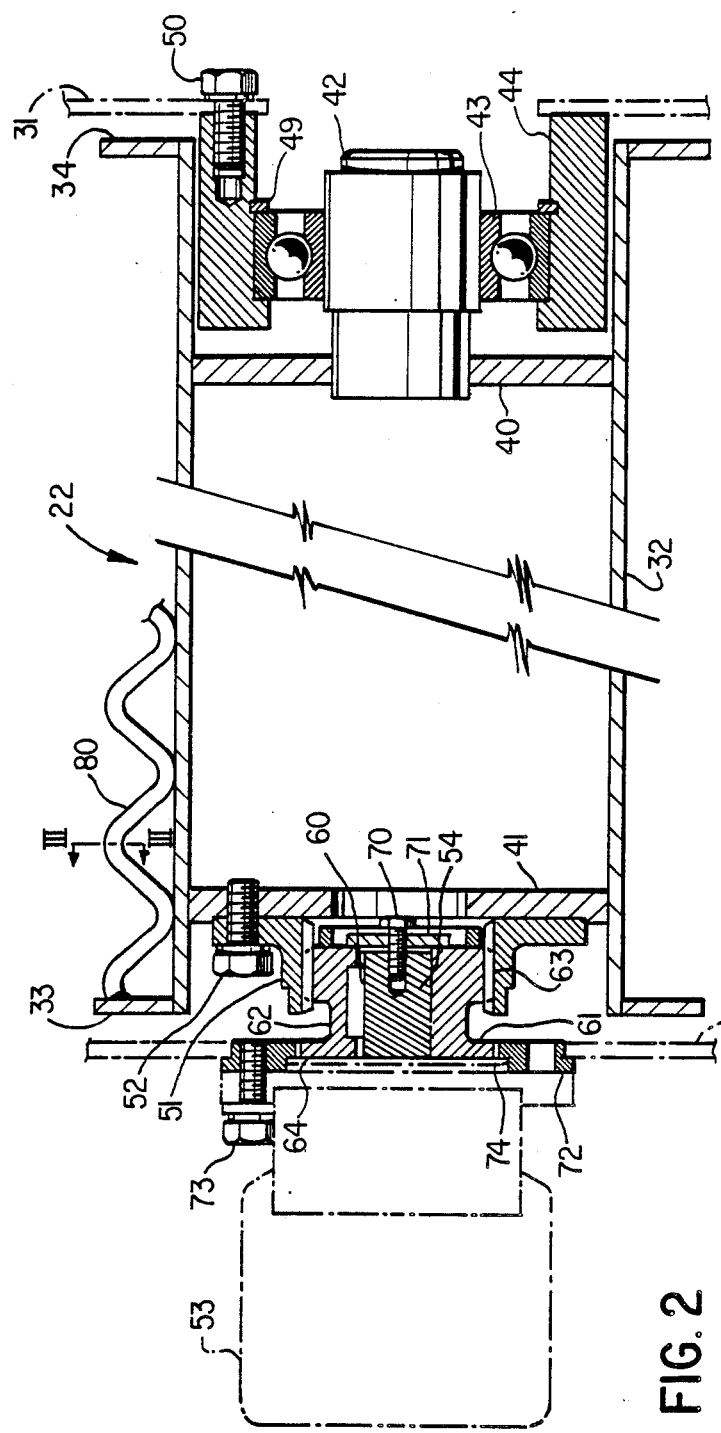
FIG. 2
FIG. 3

CANE HARVESTER FEED ROLL MOUNTING APPARATUS

This is a continuation of application Ser. No. 765,214 filed August 13, 1985 abandoned 7/27/88.

This application relates to a feed roller used in cane harvesters and, more particularly, to a mounting connecting for such a feed roller which roller is freely removable in a direction transverse to its longitudinal axis.

This application further relates to an automatic track adjuster and, more particularly, to an automatic track adjuster utilizing viscous fluid and hydraulics for its tightening and positioning functions.

This application further relates to a topper assembly used on a cane harvester and, more particularly, to a topper assembly used on row type green cane harvesters.

BACKGROUND OF THE INVENTION

In cane harvesters, feed rollers are used to convey the servered cane stalks from the basecutters to the chopper drums. Because of the severe operating conditions under which the rollers are operated, replacement of the wear elements on the rollers which grip and convey the cane stalk as well as the replacement of bearings used in the feed roller is frequently necessary.

Heretofore, feed rollers were removed from the frame sections in which they were mounted by removing the rollers in a direction generally parallel to the longitudinal axis of the rollers themselves. This required the removal of the bearings from the shaft of the feed roller which was often very difficult because of shaft deterioration caused by sugar juice and fibrous material wrapping itself around the feed roller shaft. Frequently, the shaft bearings would simply be destroyed in order to more easily remove the feed roller shaft. This was clearly unsatisfactory.

Topper assemblies are used in cane harvesters to sever the top or non-sugar portions of the cane crop so that the leaves will not enter the intake area of the harvester thus causing a reduction in harvester capacity and contamination of the cane billets.

Recently, with the inherent advantages resulting in an increased use of green cane harvesting, existing toppers have been unsatisfactory in some applications. These problems have included the inability to totally sever the tops of the cane and the fouling of the topper assembly by leafy material. This severing problem was particularly acute with certain new varieties of cane, that, although having increased sugar content, have also had increased fibre content as well. The increased fibre content exacerbates topper cutting problems and makes the clean cutting of tops more critical than topping cane with lower fibre content.

In row cutting machines, that is, machines which have the capabilities of cutting adjacent rows of cane in either direction, the tops gathered into the topper assembly must be disposed of on either side of the harvester away from the adjacent row of cane to be cut. Heretofore, a mechanical gate was used which, by appropriate controls, could direct the cane to either side of the topper assembly thereby to be appropriately dispersed. In conjunction with this topper assembly, multiple blades were used to sever the cane tops. All of this machinery and the mechanical controls were not necessary.

Track adjusters for the track assemblies on crawler type vehicles such as tractors, cane harvesters and the like are known. These known devices generally utilize a spring which, as the track comes under increased tension due to an obstruction, for example, being lodged in the track, becomes compressed and applies increased force on the track. When the obstruction is dislodged from the track assembly, the spring returns the track to its original position in which it is then subject to its normal tension force. The use of such springs, however, is disadvantageous due to the shock experienced by the track from the spring force when the obstruction in the track is dislodged.

Hydraulic track adjusters are also known. These adjusters utilize a hydraulic fluid circuit on both sides of the cylinder. The pressure is regulated by an accumulator or other pressure regulating device to keep the track in its tightened position. Such devices, however, while working well to maintain the track at its desired operating force level still require a track positioner to position the track in its optimum operating condition.

SUMMARY OF THE INVENTION

According to one aspect of the present invention, there is disclosed a mounting connection for a feed roller positioned between two oppositely located frame sections of a cane harvester, said connection comprising splined adaptor means mounted to one end of said feed roller about the longitudinal axis thereof and within the transverse width between said frame sections, motor means operable to power said feed roller, shaft means extending from said motor means, plate means mounted on the outside of one of said frame sections of said harvester about the longitudinal axis of said feed roller and pinion means mounted to said shaft means, said pinion means being operable to be removably engaged with said splined adaptor plate means said motor being removably mounted to said plate means.

According to a further aspect of the invention, there is disclosed a longitudinal wear element having a generally rectangular cross-section and the shape of a wave of sine wave configuration throughout substantially its entire length.

According to a further aspect of the invention, there is disclosed a machine for the manufacture of a longitudinal wear element comprising a pair of indexing gear means, power means to drive said gear means, stamping means mounted one on each of said gear means and flat metal stock introduction means to introduce metal to the area between said stamping means, said stamping means being operable to mesh and stamp said flat metal stock into a wave of sine wave configuration throughout the length of said flat metal stock.

According to a further aspect of the invention, there is disclosed a topper assembly for a cane harvester comprising gathering drum means, support arm means for said gathering drum means, one of said gathering drum means being mounted on each of said support arm means and cutting means mounted adjacent to said gathering drum means, said gathering drum means including bottom plate means, said cutting means revolving in a plane above and overlapping with the plane of said disc means.

According to yet a further aspect of the invention, there is disclosed a track adjuster for a crawler type vehicle, said adjuster comprising a hydraulic cylinder, a piston which said cylinder, a shaft extending from said piston, frame connection means operable to connect one of said cylinder or shaft to the frame of said vehicle, track connection means operable to connect the other end of said cylinder or shaft to the track of said vehicle, a hydraulic fluid circuit operatively connected to said cylinder on one side of said piston, a fitting operatively connected to said cylinder on the opposite side of said piston to allow for the insertion or discharge of a viscous fluid thereby to move said piston to a predetermined location, said hydraulic circuit being operable to allow said piston to move away from and return to said predetermined location.

BRIEF DESCRIPTION OF THE SEVERAL VIEWS OF THE DRAWINGS

An embodiment of the invention will now be described, by way of example only, with the use of drawings in which:

FIG. 2 is an enlarged cutaway view of one feed roller illustrating two embodiments of the feed roller mounting connection according to the invention;

FIG. 3 is a sectional view of a wave form slat wear element of the feed roller taken along the line III—III of FIG. 2;

DESCRIPTION OF SPECIFIC EMBODIMENT

Figure 1:
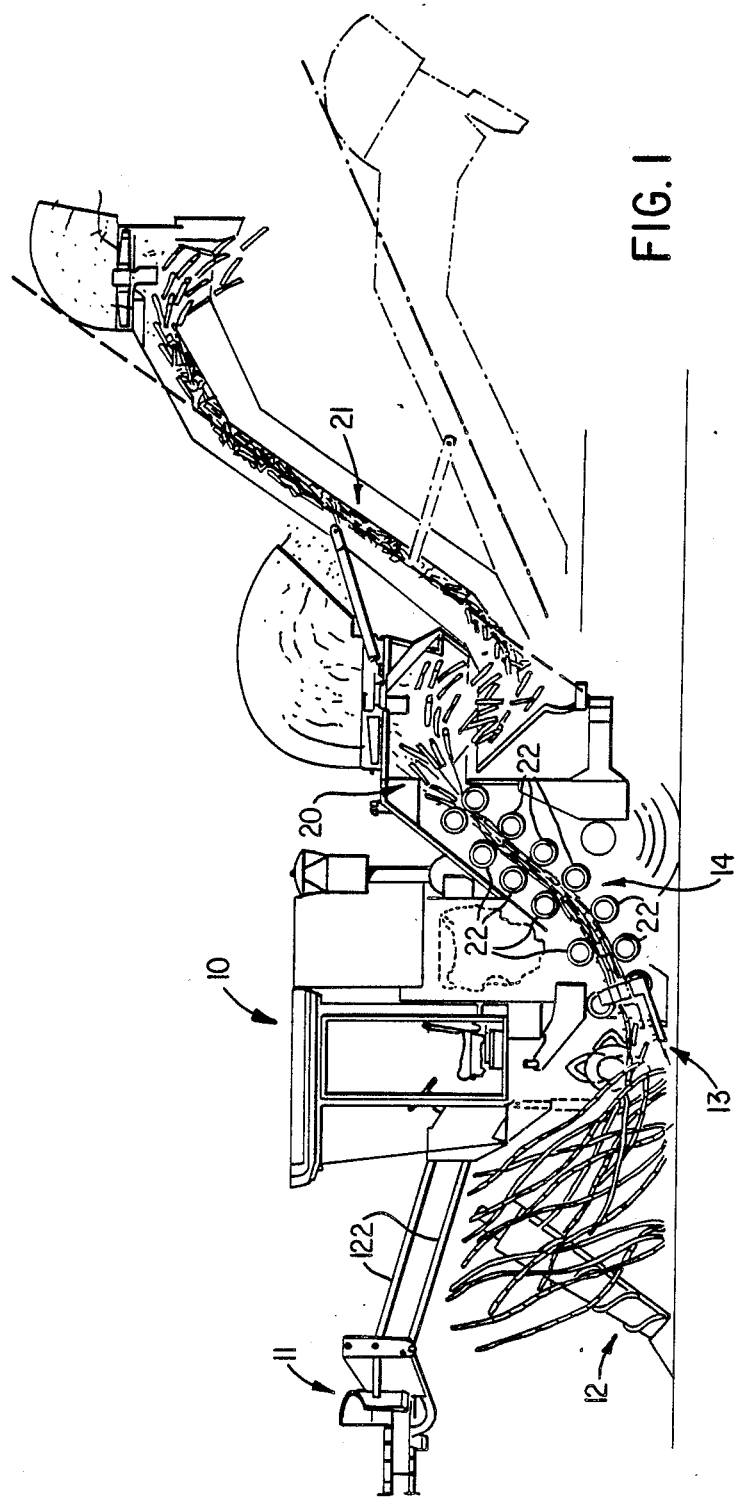
FIG. 1 is a diagrammatic side view of a cane harvester illustrating the several feed rollers.

A cane harvester is shown generally at 10 in FIG. 1. It comprises a topper generally shown at 11, a gathering area generally shown at 12, a basecutter generally shown at 13, a feeding area generally shown at 14, a cleaning area generally shown at 20, and a conveying and discharge area generally shown at 21.

Cane cut by the basecutter 13 is carried from the basecutter 13 through the feeding area 14 to the cleaning area 20 by a series of feed rollers, all of which are denoted 22, and each of which is mounted transversely between the oppositely located frame sections 30, 31 (FIG. 2) of the harvester 10, which also house the chopper drums 23, the fuel and hydraulic fluid tanks, the basecutters 23 and various other mechanisms not relevant to the present invention.

Feed roller 22 is hollow. Its outside periphery is defined by a circumferential housing 32 extending substantially across the transverse width between the frame sections 30, 31. The circumferential housing 32 has two discs 33, 34 mounted one on each end of the housing 32 by welding and two plate portions 40, 41 are mounted by welding within the circumferential housing 32.

There are two mounting arrangements illustrated in FIG. 2. The mounting arrangement on the left hand side of the feed roller 22 is utilized when a hydraulic motor is required to power the feed roll and the mounting arrangement on the right hand side of FIG. 2 is used when no such motor is required. On the right hand side, a shaft 42 is connected to plate portion 40 and extends outwardly therefrom to the end of the feed roller 22.

A bearing 43 is mounted on shaft 42 within a bearing housing 44. Bearing housing 44 is connected to frame section 31 by a series of hex bolts 50 (only one of which is shown). A circlip 49 is mounted in bearing housing 44 and retains the bearing 43 therein.

On the left hand side of the feed roller 22, where a motor is utilized, a splined adaptor plate 51 is mounted to the plate portion 41 of feed roller 22 by a series of hex bolts 52 (only one of which is shown) around the longitudinal axis thereof.

A hydraulic motor generally shown at 53 has a shaft 54 extending therefrom. A keyway 60 is provided and a drive pinion 61 is mounted to the shaft 54 using the keyway 60. Pinion engagement area 63 of drive pinion 61 can be removably engaged with the splined adaptor plate 51, so that drive pinion 61 is rotatable with shaft 54 relative to a second adaptor plate 72. The opposite end of drive pinion 61 defines the adaptor plate area 64. Drive pinion 61 has a middle diameter area 62 which has a reduced diameter respective to both the pinion engagement area 63 and the adaptor plate area 64, nearest the motor 53. Drive pinion 61 is secured to the shaft 54 of hydraulic motor 53 by a hex bolt 70 and spring washer 71.

A second adaptor plate 72 having an opening therethrough is mounted on the outside of frame section 30 by welding. Hydraulic motor 53 is removable mounted to the adaptor plate 72 by a series of hex bolts 73 (only one of which is shown). The adaptor plate area 64 of drive pinion 61 is closely received in the opening in the second of the second adaptor plate 72. The inside diameter of the adaptor plate 72 is approximately 0.020" greater than the outside diameter of the adaptor plate area 64 of drive pinion 61. This area is called the "labyrinth area 74" as will be explained hereafter.

The labyrinth area 74 enables the drive pinion to be rotatable with shaft 54 and to be selectively withdrawn through the opening in second adaptor plate 72, while preventing the unsatisfactory entry of juices and fibrous material in conventional feed rollers.

A series of wave form slat wear elements 80 (only one of which is shown) are mounted on the outside of feed roller 22 by welding. Wear elements 80 are longitudinal and are of mild flat steel with a generally rectangular cross-section, as can be seen in FIG. 3. They are replaceable on the feed roller 22 when desired. Each wear element 80 is in the form of a wave or sine wave configuration throughout its length.

It will be understood that feed roller 22 may have a one or two motor mounting arrangement. When a two motor mounting arrangement is used, the mounting arrangement illustrated at the right of FIG. 2 will be replaced with a mounting arrangement mirror identical to that shown on the left hand end portion of feed roller 22 as illustrated in FIG. 2.

The topper assembly 11 is supported by parallel twin arms 122. Twin arms 122 are vertically adjustable by retracting or extending a hydraulic cylinder (not shown) connected between the frame of the harvester 10 and the support twin arms 122.

Figure 7:
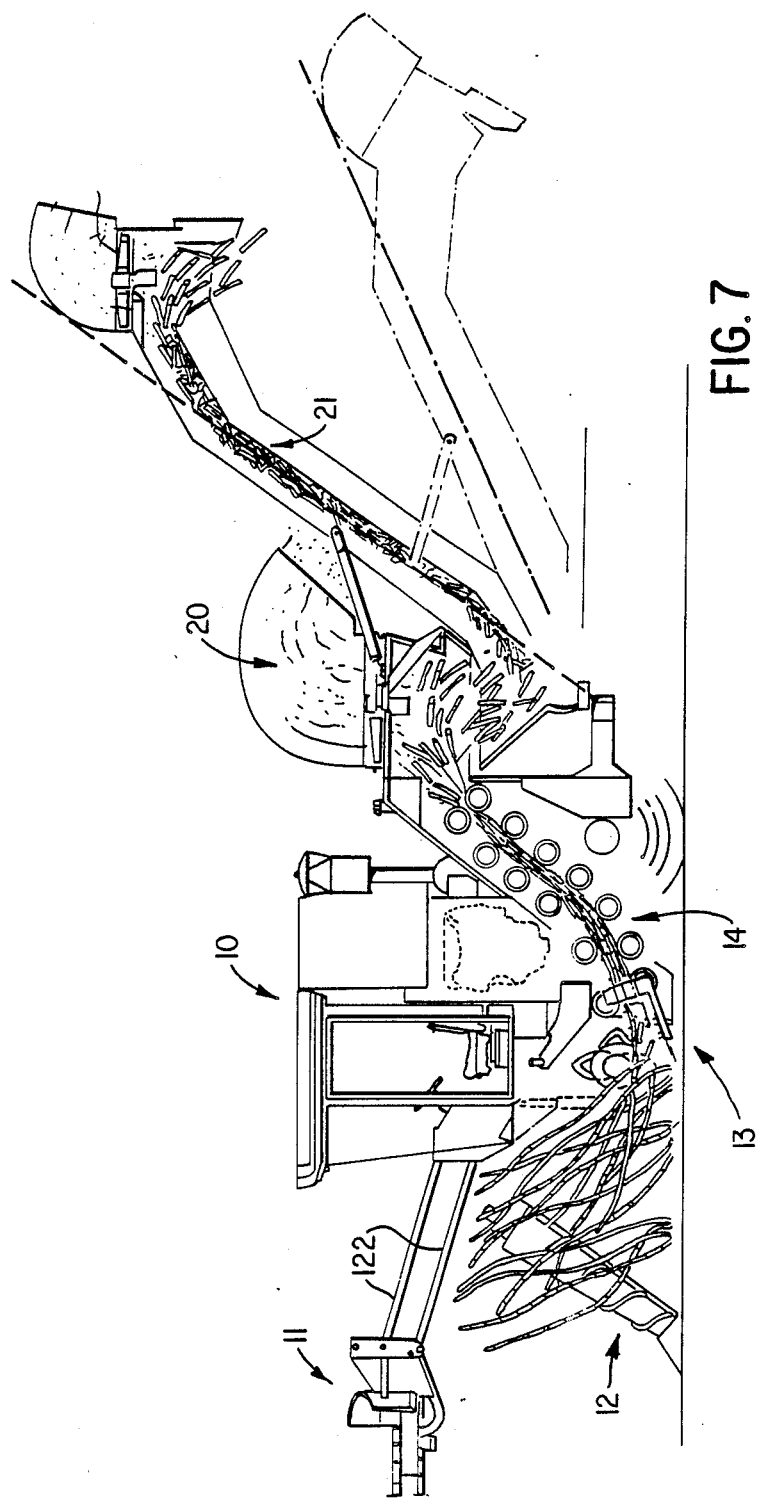
FIG. 7 is an enlarged side view of the topper assembly of FIG. 6.
Figure 8:
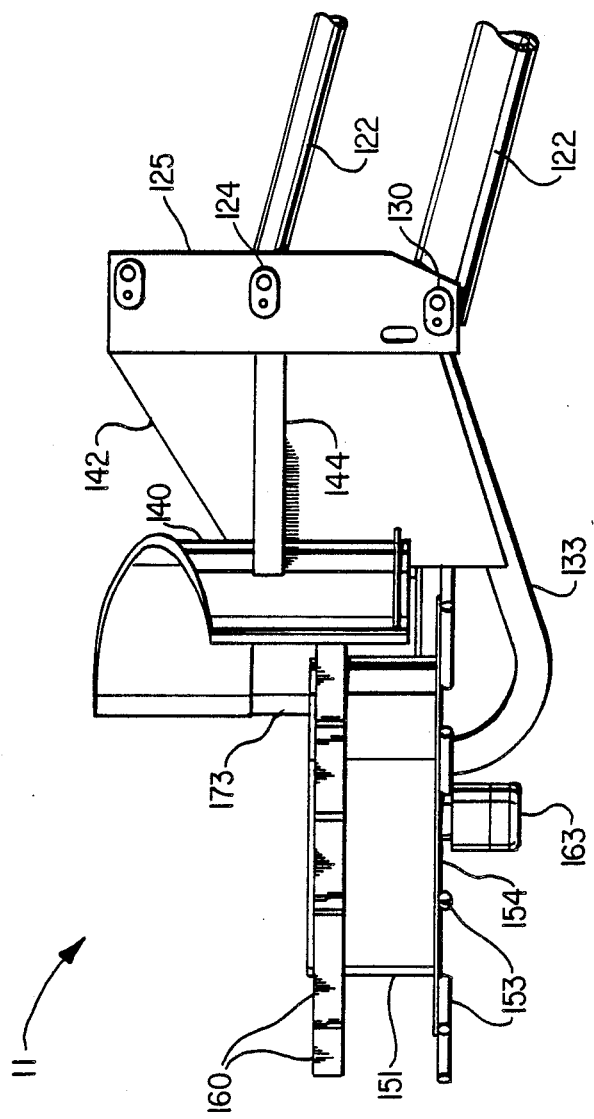
FIG. 8 is an enlarged plan view of the topper assembly of FIG. 6.
Figure 9:
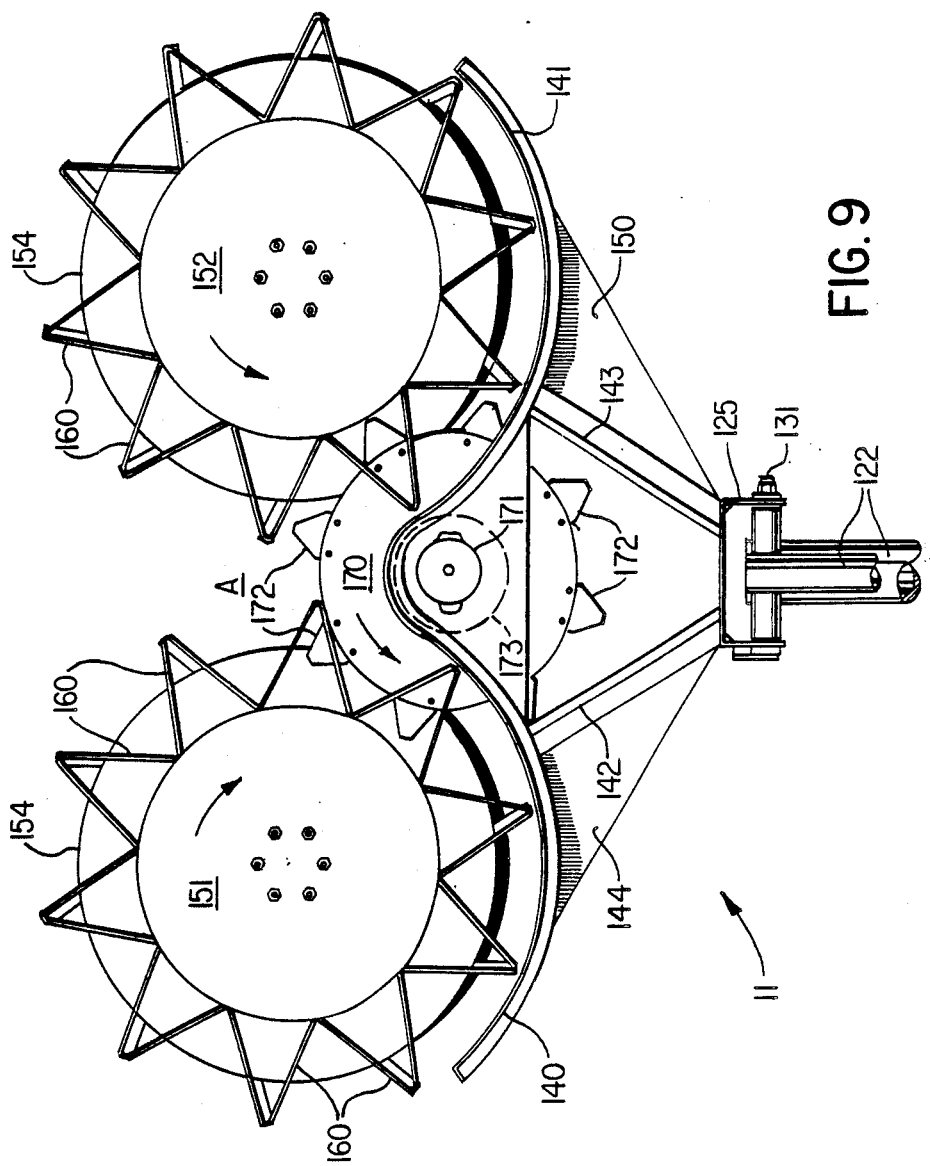
FIG. 9 is an enlarged front view of the topper assembly of FIG. 6.

The topper assembly 11 is shown more clearly in FIGS. 7-9. Referring to FIG. 7, the twin arms 122 are connected to a mounting bracket 125 holding the topper assembly 11 at an upper and lower location 124, 130 respectively, by using bolt connection 131 (only one of which is shown in FIG. 8). A left and right arm pipe, or support arm 133, 134 respectively, extend in a downwardly and upwardly curved configuration from the mounting bracket 125 to the support bearing of the topper assembly 11. Right and left hand backing sheets 141, 140 are connected to the mounting bracket 125 by reinforcement members 143, 142, respectively. Side sheets 144, 150 are connected between the backing sheets 140, 141 and the mounting bracket 125.

The topper assembly 11 includes twin gathering drums 151, 152 mounted on the support arms 133, 134 respectively. Each gathering drum 151, 152 includes rod shaped gathering fingers 153 connected to bottom plates 154 and ribbon gathering fingers 160 mounted to the drums 151, 152.

Hydraulic motors 163, 164, one for each of the gathering drums 151, 152, power the gathering drums 151, 152.

A cutter disc 170 is connected to a cutter drum 173 which is connected to a hydraulic motor 171 and is rotatable in a plane above the bottom plates 154, as best seen in FIG. 9. Removable knives 172 are mounted to the cutter disc 170 intermittently around its circumference. Hydraulic motor 171 is reversible so that cutter disc 170 may be rotated either in a clockwise or counter-clockwise direction.

Figure 10:
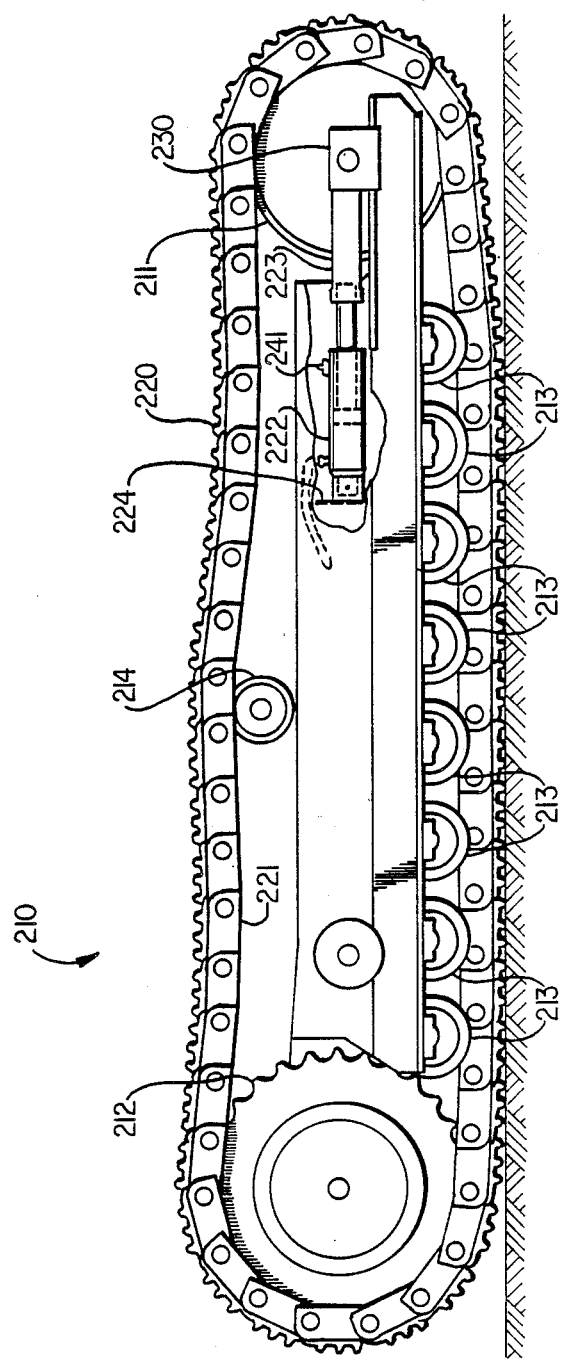
FIG. 10 is a side view of a track assembly utilizing the track adjuster of the present invention.

A track assembly is generally shown at 210 in FIG. 10. Such a track assembly is utilized on crawler type vehicles such as tractors, cane harvesters and the like, particularly under wet operating conditions.

It will be appreciated that the description herein is limited to one track of the vehicle only but that such description is similarly applicable to the opposite track. The track assembly 210 comprises a front idler roller 211, a rear power track sprocket 212, a series of eight smaller track rollers each denoted 213, a return roller 214 and the track shoe 220 mounted on chain 221. Chain 221 moves on the return roller 214 and track rollers 213.

A hydraulic cylinder 222 is mounted on one end to the track frame 224 and on the other end to a yoke 223. Yoke 223 is connected to the axle assembly 230 of the front idler roller 211. The axle assembly 230 together with the front idler roller 211 may be moved forwardly or rearwardly as desired by the operator as will be explained hereafter.

A grease fitting 241 is provided on the hydraulic cylinder 222. Grease may be inserted into or removed from the hydraulic cylinder 222 for purposes which will be explained hereafter.

Figure 11:
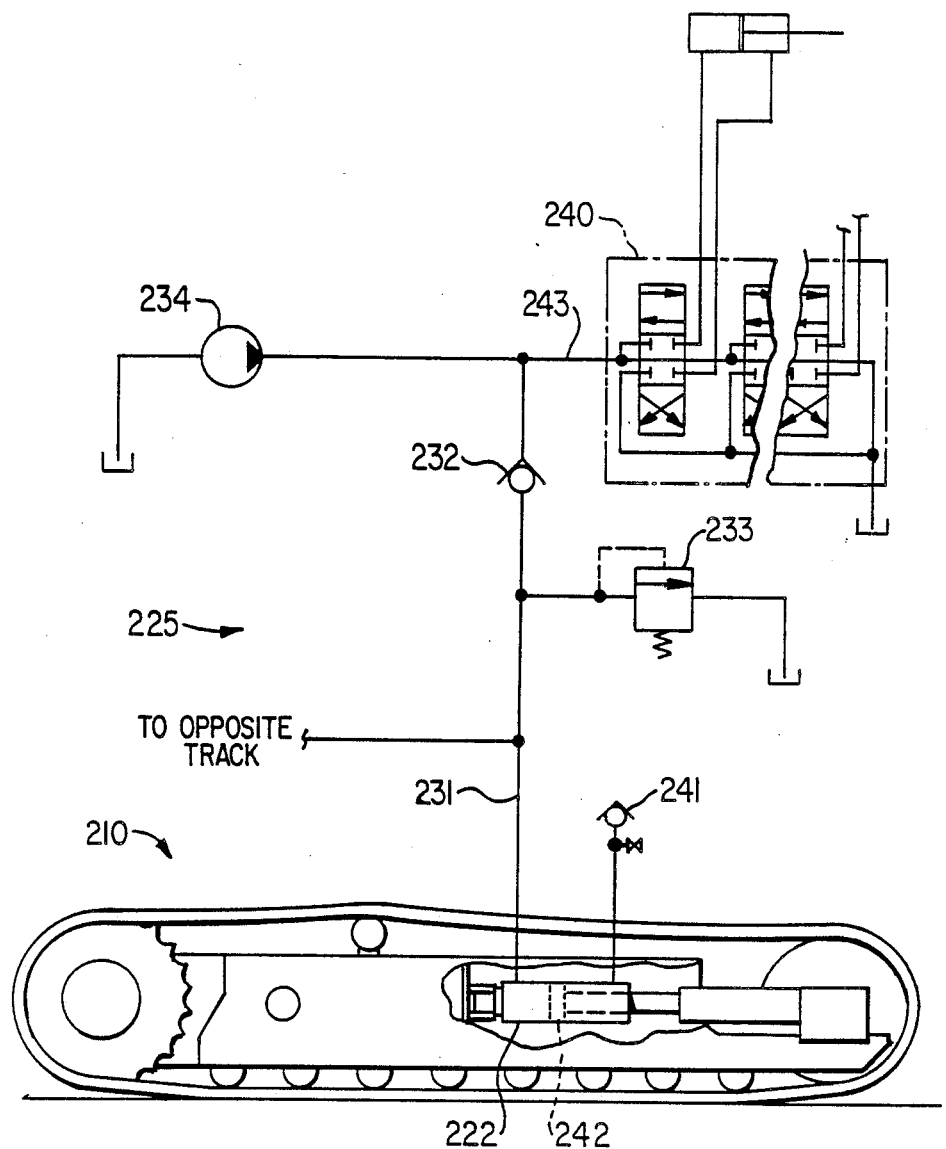
FIG. 11 is a diagrammatic view of the hydraulic circuit used for the track adjuster and its associated hydraulic circuit.

A hydraulic circuit generally denoted 225 is connected to the hydraulic cylinder 222 on one side of the piston 242 as seen in FIG. 11. It includes a fluid line 231 extending from hydraulic cylinder 222, a check valve 232 and a pressure relief valve 233 tee connected to the fluid line 231. A relatively small hydraulic pump 234 provides fluid to a multibank control valve 240 which controls the various operations of the cylinders of the vehicle to which the track assembly 210 is attached. The fluid line 231 extends from check valve 232 to a point between hydraulic pump 234 and the multibank control valve 240. Check valve 232 allows fluid to pass to the hydraulic cylinder 222 but will not allow fluid to pass in the reverse direction except through pressure relief valve 233. Pressure relief valve 233 allows fluid to leave hydraulic cylinder 222 when a certain predetermined pressure is reached.

OPERATION

In operation, the cane harvester 10 will move to the left as seen in FIG. 1. It gathers cane crop into the gathering area 12 where the cane stalks are severed by the basecutter 13 and conveyed through the passage between the feed rollers 22 between the wave form slat wear elements 80. As the wear elements 80 become worn or if it is desired to remove the feed rollers 22 for bearing replacement or other servicing, the hex bolts 73 mounting the hydraulic motor 53 to the adaptor plate 72 are removed and, as well, the hex bolts 50 mounting the bearing housing 44 to the frame section 31 are removed while supporting the feed roller 22. The motor 53 is then pulled outwardly from the feed roller 22. The drive pinion 61 will slide outwardly from the splined adaptor plate 51. After the drive pinion 61 has cleared the diameter in frame 30, the feed roller 22 may be lowered to the ground within frame sections 30, 31 for servicing. Bearing 43 may be removed from shaft 42 if necessary and the wear elements 80 may be replaced. All of this servicing be performed in an environment more convenient than that in the harvesters 10.

Figure 4:
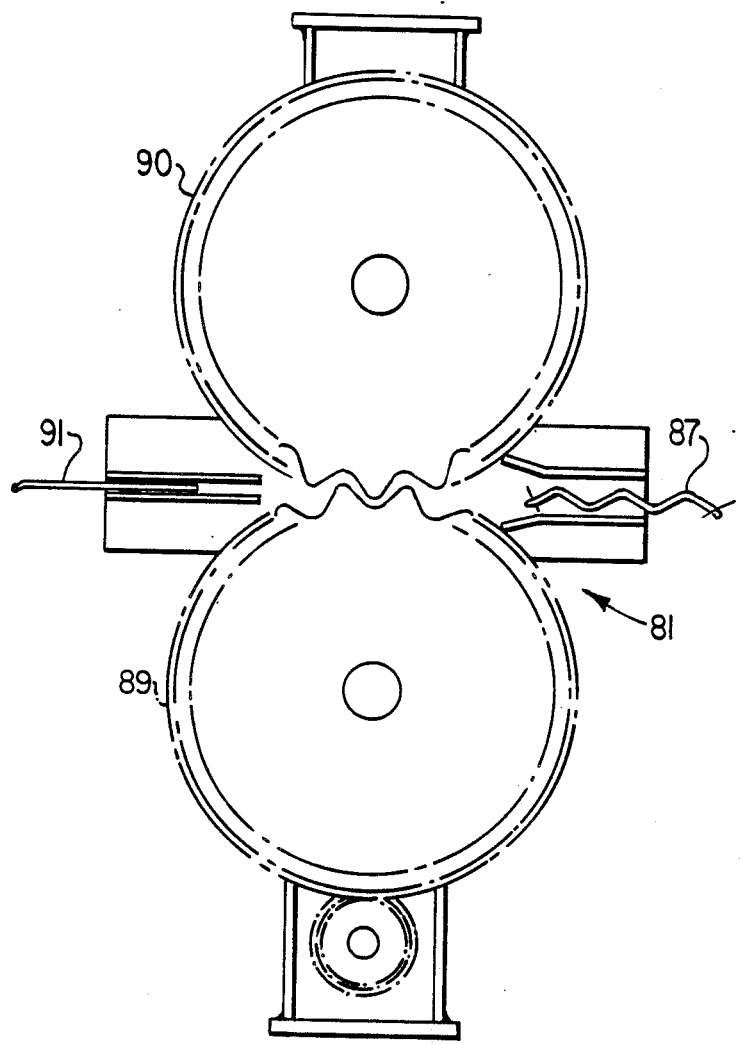
FIG. 4 is a front view of the machine used to manufacture the wave form slat wear elements.
Figure 5:
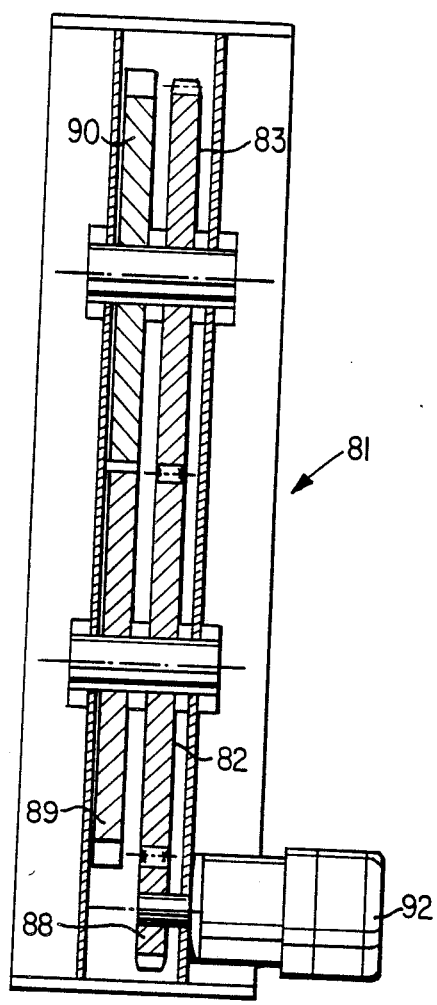
FIG. 5 is a side sectional view of the machine of FIG. 4.
Figure 6:
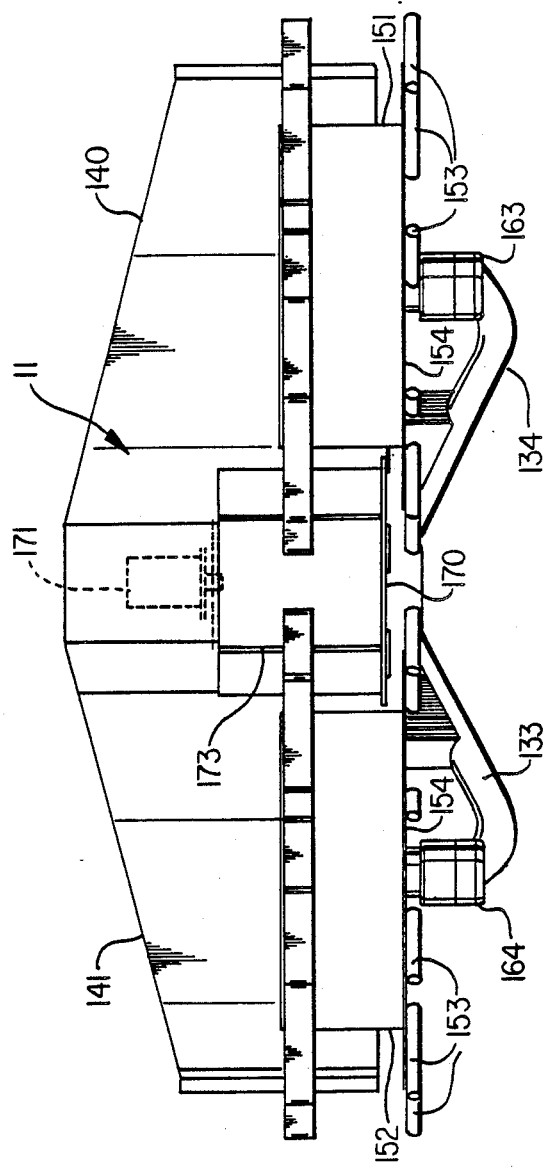
FIG. 6 is a side view of a cane harvester including the topper assembly according to the invention.

The wave form slate weare elements 80 are manufactured by the use of a specially adapted manufacturing machine generally denoted 81 as illustrated in FIGS. 4 and 5. Machine 81 comprises two gears 82, 83 which mesh. A pair of stamping wheels 89, 90 are coaxial with the gears 82, 83 and mesh as illustrated. Flat metal stock 91 is introduced into the stamping area and a hydraulic motor 92 is connected to gear 82 using pinion 88 and commences operation. The metal stock 91 passes through the machine 81 and emerges with a configuration in the wave or sine wave configuration illustrated at 87. It is severed at the desired length.

It will be understood that, of course, the drive pinion 61 and splined adaptor plate 51 used for mounting the feed roller 22 could be reversed. That is, the drive pinion 61 could be mounted on a shaft extending from the plate portion 40 of the feed roller 22 while the splined adaptor plate 51 could extend from the hydraulic motor 53.

The topper assembly 11 will be raised or lowered by the twin arms 122 connected to the hydraulic cylinder (not shown).

Gathering drums 151, 152 are rotated in the directions indicated in FIG. 8. As the harvester 10 encounters cane, the cane tops will be contacted by the rod shaped gathering fingers 153 which will move the cane tops into the central cutting area A as viewed in FIG. 8. The cutter disc 170 and cutter drum 173 are rotated in the direction desired by the operator. That is, if the cane tops are desired to be thrown to the leftwards area of the harvester 10, the cutter disc 170 will be rotated in the counter-clockwise direction indicated and if the cane tops are desired to be thrown to the right side of the harvester 10, the cutter disc 170 will be rotated in a reverse direction to that shown or clockwise.

As the cane stalks are fed into the cutting area A by the rod shaped fingers 133, they will be forced by the cutting knives 172 into contact with the bottom plate 154 of the gathering drum selected (gathering drum 151 as viewed in FIG. 8). The reinforcing or stiffening effect provided by the cantilever type contact provided between the bottom plate 154 and the knives 172 will allow the knives 172 to effectively sever the cane tops from the cane stalks.

The cutting drum 173 rotating coaxially with the cutting disc 170 ensures the severed top will come under the influence of the ribbon gathering fingers 160, and they will be carried under this influence over bottom plate 154 and around the backing sheet 140 to the discharge point where they are thrown clear of the harvester 10 and discharged to the ground.

The downwardly rounded contour of the support arms 133, 134, which allows a clearance area between the arms 133, 134 and the gathering drums 151, 152 will prevent the buildup of trash in that area.

The design of the backing sheets 140, 141 is of some interest. It is desirable, in disposing of the cane tops, that they be thrown not only away from the adjacent row of cane to be cut but that they be deposited a distance sufficient to avoid contact which can cause discomfort to the driver of an accompanying vehicle such as, for example, a billet transporter. In the event more control over the discharge trajectory of the cane tops is desired, gates may be provided which are hinged to the respective backing sheets 140, 141. Manual or remote control of these gates can be provided as desired.

It will be initially assumed that the track has been correctly adjusted and that the vehicle (not shown) is moving on the track assembly 210. An object (not shown) becomes lodged in the track assembly 210 and the chain 221 becomes tightened as the obstruction moves along between the chain 221 and the track rollers 213, the idler roller 211 and the rear power track sprocket 212. As the chain 221 tightens, the piston 242 will be forced leftwardly by the front idler roller 211 and attached axle assembly 230 and yoke 223, as viewed in FIG. 10. This will increase the pressure in the hydraulic circuit 225 to a point where the pressure relief valve 233 is activated to discharge the fluid creating the excess pressure thereby allowing the chain 221 to accommodate the obstruction.

When the obstruction is dislodged from the chain 221, the back pressure between hydraulic pump 234 and multibank control valve 240 in fluid line 243 will slowly move back into hydraulic cylinder 222 through check valve 232 and force piston 242 to its original position. When a cylinder function controlled by multibank control valve 240 is activated, more fluid under greater pressure will move into the hydraulic cylinder 222 through check valve 232. It is also to be noted that a second track assembly (not shown) on the opposite side of the vehicle is connected in parallel to the hydraulic fluid circuit as depicted. Thus, any "out of adjustment" is halved because of the twin tracks. If, for example, a cane harvester reaches the end of the row and turns, a cylinder function will be activated to adjust the harvester height.

To set the front idler roller 211 in its desired predetermined position, hydraulic cylinder 222 is again utilized. The operator will insert or remove grease from the hydraulic cylinder 222 via the grease fitting 241. By adding grease via fitting 241 to the hydraulic cylinder 222, the chain 221 is loosened. Allowing grease to escape from fitting 241, the piston 242 will move rightwardly to tighten the chain 221. Thus, the normal operating position of piston 242 and, therefore, tightness of chain 221 may be selected. As wear of the track assembly 210, occurs, the chain 221 may be tightened by simple removing grease from the hydraulic cylinder 222 via grease fitting 241.

It is also contemplated that, for certain applications, there may be a requirement to keep the chain in its tightened position by positive operator control or by providing a device utilizing pressure other than that provided by the back pressure between the multibank control valve 240 and the pump 234, which pressure would immediately return the piston 242 to its normal operating position following its displacement by the lodgement of a foreign object in the chain 221 or the like.

While a specific embodiment of the invention has been described, it should be construed as illustrative only and not as limiting the scope of the invention as defined in the accompanying claims.

I claim:

1. In a cane harvester, a feed roller rotatably mounted between two oppositely located frame sections of the harvester by opposed mounting connections, the improvement comprising at least one of the mounting connections comprising a splined adaptor plate mounted to one end of the feed roller about the longitudinal axes thereof and within the transverse width between said frame sections, a motor operable to power said feed roller, a shaft extending from the motor, a second adaptor plate having an opening therethrough and mounted on the outside of one of said frame sections of the harvester about the longitudinal axes of said feed roller with the motor being removably mounted to said second adaptor plate, and pinion means mounted on the shaft, said pinion means having a first end portion removably engaged with the splined adaptor plate and an opposite end portion closely received in the opening in the second adaptor plate, the pinion means being rotatable with the shaft relative to the second adaptor plate and selectively withdrawable through the opening in the second adaptor plate.

2. The improvement according to claim 1 wherein said pinion means has a reduced diameter portion between the first and opposite end portions.

3. The improvement according to claim 1, wherein said pinion means is mounted for rotation with the shaft by key way means.

4. The improvement according to claim 1, wherein the opposite mounting connection comprises a shaft extending from the other end of said feed roller about its longitudinal axis and within the transversed width between said frame sections, bearing means mounted about the shaft within a bearing housing said bearing housing being removable connected to the inside of the other of said frame sections.

5. The improvement according to claim 1 wherein the opening in the second adaptor plate has a diameter about 0.020 inches greater than the diameter of the opposite end portion of the pinion means.

* * * * *